United States Patent
Hosokawa

(10) Patent No.: US 8,010,148 B2
(45) Date of Patent: Aug. 30, 2011

(54) MOBILE TERMINAL AND CONTROL METHOD THEREFOR

(75) Inventor: Taisuke Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 905 days.

(21) Appl. No.: 11/988,470

(22) PCT Filed: Sep. 1, 2006

(86) PCT No.: PCT/JP2006/317350
§ 371 (c)(1),
(2), (4) Date: Jan. 8, 2008

(87) PCT Pub. No.: WO2007/029618
PCT Pub. Date: Mar. 15, 2007

(65) Prior Publication Data
US 2009/0149210 A1    Jun. 11, 2009

(30) Foreign Application Priority Data
Sep. 9, 2005 (JP) .................. 2005-262423

(51) Int. Cl.
*H04B 7/00* (2006.01)
(52) U.S. Cl. ........ 455/522; 455/69; 455/63.1; 455/13.4; 455/114.2; 455/127.5; 370/318
(58) Field of Classification Search .............. 455/522, 455/13.4, 15, 69, 435.1, 455, 456.6, 560, 455/561, 127.1–127.5, 63.1, 114.2, 291; 370/318, 335; 713/320
See application file for complete search history.

(56) References Cited

U.S. PATENT DOCUMENTS
2006/0293075 A1* 12/2006 Kansakoski et al. .......... 455/522

FOREIGN PATENT DOCUMENTS

| JP | 2000-252917 | 9/2000 |
|---|---|---|
| JP | 2002-543663 | 12/2002 |
| JP | 2004-242148 | 8/2004 |
| JP | 2006-50498 | 2/2006 |
| JP | 2006-246045 | 9/2006 |
| WO | WO 2004/049589 | 6/2004 |
| WO | WO 2004/054130 A2 | 6/2004 |

* cited by examiner

*Primary Examiner* — Shaima Q Aminzay
(74) *Attorney, Agent, or Firm* — McGinn IP Law Group, PLLC

(57) ABSTRACT

A mobile terminal detecting an instantaneous deterioration in BLER and quickly converging an SIR into an appropriate target SIR, thereby preventing requesting an excessive transmission power from a base station and a method of controlling the mobile terminal are provided. The present invention relates to the mobile terminal including a target SIR control unit 105 that detects a burst error state indicating a deterioration in a communication environment, a burst error return state indicating a return of the communication environment, and a normal communication state indicating a good state of the communication environment based on whether a cyclic redundancy check is good, after detecting the burst error state, decreases the target SIR by a first decrease amount whenever an OK determination result of the cyclic redundancy check is obtained, detects a state in which the target SIR is decreased by a burst error return criterion that is a preset decrease amount, determines that the detected state is a burst error return state, and decreases the target SIR by a preset second decrease amount, and the method of controlling the mobile terminal.

8 Claims, 3 Drawing Sheets

MOBILE TERMINAL AND CONTROL METHOD THEREFOR

TECHNICAL FIELD

The present invention pertains to a mobile terminal using Wideband Code Division Multiple Access (WCDMA), and particularly to an outer loop transmission power control.

BACKGROUND ART

There is conventionally known WCDMA as one of typical communication methods used in mobile communication systems. According to the WCDMA, a plurality of channels uses the same frequency, so that the channels are often faced with interferences from the other channels.

Such an interference of the other channels according to the WCDMA is generally greater if a transmission power from a base station is higher. Since it is known that this interference is a main factor for deciding a line capacity of the base station, it is desirable to reduce the transmission power from the base station as lower as possible in view of the capacity of the line to be used.

Meanwhile, a communication quality of a communication between the mobile device or mobile terminal and the base station depends on SIR (Signal to Interference Ratio). Namely, if the transmission power from the base station is higher, the SIR is higher and the communication quality is improved. If the transmission power from the base station is lower, the SIR is lower and the communication quality is degraded.

It is, therefore, necessary to control a magnitude of a target SIR of the mobile device or mobile terminal so as to cause the mobile device or mobile terminal to satisfy an appropriate communication quality according to a status of a communication environment and to reduce the transmission power from the base station.

Outer loop transmission power control normally used in the WCDMA is intended to optimize the line capacity and the communication quality by controlling the transmission power from the base station so that the communication quality of the mobile device or mobile terminal is equal to a desired communication quality designated by network side.

Specifically, the target SIR of the mobile terminal is controlled so that a BLER (Block Error Rate) indicating the communication quality between the base station and the mobile terminal is equal to a target BLER designated by a network where the base station is present, and the mobile terminal indirectly controls the transmission power from the base station.

As this target SIR control method, a cellular system transmission power control method including causing a receiver side to detect a frame error, calculating the number n of frame errors indicating the number of frames until m frame errors are detected whenever the m frame errors are detected, and increasing or decreasing a target SIR according to the number n of frame errors is disclosed (see Patent Document 1).

Patent Document 1: Japanese Patent Application Laid-Open No.

DISCLOSURE OF THE INVENTION

Problems to be Solved by the Invention

However, if the target SIR is controlled using only results of the target BLER designated by the network and a CRC (Cyclic Redundancy Check) in an environment in which an influence of shadowing or the like that deteriorates a communication environment deteriorates the BLER instantly and rapidly, and if the determination result of the BLER is NG as indicated by a polygonal curve 802 shown in FIG. 1, the target SIR suddenly increases during a period RP as indicated by a polygonal curve 801 for the improvement of the BLER. Furthermore, even after the BLER is improved, the state of the high target SIR continues.

Nevertheless, an appropriate range of the target SIR in a state of a good communication environment corresponds to a range from S1 to S2 shown in FIG. 1.

Due to this, the transmission power from the base station greatly increases according to an increase in the target SIR. The mobile terminal disadvantageously requests excessive transmission power from the base station for a while after the communication environment is returned to a normal environment.

On the other hand, if a good communication environment in which the target BLER is satisfied at a low SIR is moved to a bad communication environment in which the target BLER can be satisfied only at a high SIR, it is disadvantageously necessary to continuously make the target SIR high so as to satisfy the target BLER.

Therefore, an object of the present invention is to provide a mobile terminal capable of preventing the mobile terminal from requesting an excessive transmission power from a base station by detecting an instantaneous deterioration or restoration of a communication environment and by quickly converging a SIR into a target SIR.

Means for Solving the Problems

To attain the object, a first invention of a mobile terminal according to the present invention is a mobile terminal conducting a cyclic redundancy check on a transmitted signal from a base station to determine whether a communication environment of a communication with the base station is good, and increasing or decreasing a target SIR for deciding a transmission power from the base station, comprising a target SIR control unit that: after increasing the target SIR by a preset increase amount according to a NG determination result of the cyclic redundancy check and before decreasing the target SIR by a burst error criterion that is a preset decrease amount, detects that the NG determination result of the cyclic redundancy check occurs again, determines that a detected state is a burst error state indicating a deterioration in the communication environment, and decreases the target SIR by the first decrease amount whenever an OK determination result of the cyclic redundancy check is obtained after determining the burst error state;

after detecting the burst error state, detects a state in which the target SIR is decreased by a burst error return criterion that is a preset decrease amount, determines that a detected state is a burst error return state indicating a return of the communication environment, and decreases the target SIR by a preset second decrease amount whenever the OK determination result of the cyclic redundancy check is obtained; and detects a state in which the target SIR is decreased by a normal communication criterion that is a preset decrease amount after detecting that the NG determination result of the cyclic redundancy check occurs, or detects that the target SIR is below a preset normal communication state threshold value after determining the burst error return state, determines that the detected state is a normal communication state indicating a good state of the communication environment, and decreases the target SIR by the first decrease amount.

A second invention is the mobile terminal according to the first invention, wherein the target SIR control unit detects that a following expression (1) is satisfied if it is assumed that the target SIR immediately after an increase is T_SIR(T−1), the target SIR when the NG determination result of the cyclic redundancy check is detected and immediately before the increase is T_SIR_tbng, the increase amount of the target SIR is Sinc, and a burst error determination coefficient for determining the burst error state is T_burstin, and determines that the detected state is the burst error state:

$$T\_SIR(T-1) > T\_SIR\_tbng + Sinc*T\_burstin \qquad (1).$$

A third invention is the mobile terminal according to the first invention, wherein the target SIR control unit detects that a following expression (2) is satisfied if it is assumed that the target SIR immediately after an increase is T_SIR(T−1), the target SIR when the NG determination result of the cyclic redundancy check is detected and immediately before the increase is T_SIR_tbng, the increase amount of the target SIR is Sinc, and a normal communication determination coefficient for determining the normal communication state is T_burstout, and determines that the detected state is the normal communication state:

$$T\_SIR(T-1) < T\_SIR\_tbng + Sinc*T\_burstout \qquad (2).$$

A fourth invention is the mobile terminal according to the first invention, wherein the target SIR control unit detects that a following expression (3) is satisfied if it is assumed that the target SIR immediately after an increase is T_SIR(T−1), the target SIR when the NG determination result of the cyclic redundancy check is detected and immediately before the increase is T_SIR_tbng, the increase amount of the target SIR is Sinc, and a burst error return determination coefficient for determining the burst error return state is T_burstok, and determines that the detected state is the burst error return state:

$$T\_SIR(T-1) < T\_SIR\_tbng + Sinc*T\_burstok \qquad (3).$$

A fifth invention is the mobile terminal according to the first or second invention wherein the burst error criterion is indicated by the Sinc*T_burstin in the expression (1).

A sixth invention is the mobile terminal according to the first or third invention, wherein the normal communication criterion is indicated by the Sinc*T_burstout in the expression (2).

A seventh invention is the mobile terminal according to the first or fourth invention, wherein the burst error return criterion is indicated by the Sinc*T_burstok in the expression (3).

An eighth invention is a method of controlling a mobile terminal conducting a cyclic redundancy check on a transmitted signal from a base station to determine whether a communication environment of a communication with the base station is good, and increasing or decreasing a target SIR for deciding a transmission power from the base station, comprising steps of:

after increasing the target SIR by a preset increase amount according to a NG determination result of the cyclic redundancy check and before decreasing the target SIR by a burst error criterion that is a preset decrease amount, detecting that the NG determination result of the cyclic redundancy check occurs again, determining that a detected state is a burst error state indicating a deterioration in the communication environment, and decreasing the target SIR by the first decrease amount whenever an OK determination result of the cyclic redundancy check is obtained after determining the burst error state;

after detecting the burst error state, detecting a state in which the target SIR is decreased by a burst error return criterion that is a preset decrease amount, determining that a detected state is a burst error return state indicating a return of the communication environment, and decreasing the target SIR by a preset second decrease amount whenever the OK determination result of the cyclic redundancy check is obtained; and detecting a state in which the target SIR is decreased by a normal communication criterion that is a preset decrease amount after detecting that the NG determination result of the cyclic redundancy check occurs, or detecting that the target SIR is below a preset normal communication state threshold value after determining the burst error return state, determining that the detected state is a normal communication state indicating a good state of the communication environment, and decreasing the target SIR by the first decrease amount.

The conventional mobile terminal conducts a CRC, determines whether a BLER is OK as this CRC, increases a target SIR by a preset increase amount whenever the NG determination result occurs, and decreases the target SIR by a certain amount smaller than the constant increase amount if the determination result is OK. Due to this, a decrease degree of the target SIR is gentle as compared with a rapid increase in the target SIR.

As can be seen, the conventional mobile terminal controls the target SIR to be increased or decreased based on whether the BLER is OK or NG.

According to the present invention, the target SIR is increased based on the NG determination result of the BLER similarly to the conventional technique. However, a decrease control over the target SIR exercised by the mobile terminal according to the present invention has a function of evaluating a communication quality in more detail depending on a state detected by the target SIR control unit.

The state in which the target SIR control unit detects the communication environment comprises three stages of a burst error state, a burst error return state, and a normal communication state. The target SIR is decreased by a preset decrease amount according to each of the states.

If the communication environment is deteriorated to a state in which the NG determination result of the BLER as the CRC continuously occurs, or if the communication environment is in a state in which the NG determination result of the CRC occurs almost continuously, the state of the communication environment is determined as the burst error state.

Specifically, after increasing the target SIR based on the fact that the determination result of the CRC at the time of previous reception is NG, the target SIR control unit decreases the target SIR by a first decrease amount since the determination result of the CRC becomes temporarily OK. Further, the target SIR control unit detects a state in which the determination result of the CRC becomes NG again before the target SIR is decreased by a burst error criterion that is a preset decrease amount and in which the target SIR is increased by a preset increase amount, and determines that the state of the communication environment is the burst error state.

The target SIR control unit decreases the target SIR by the present first decrease amount for every reception since the OK determination of the CRC is obtained for every reception after it is determined that the state of the communication environment is the burst error state. As a result, if the decrease amount of the target SIR is equal to a preset burst error return criterion after the increase of the target SIR stops, the target SIR control unit determines that the state of the communication environment is the burst error return state.

If it is determined that the state of the communication environment is the burst error return state, the OK determination result of the CRC is obtained for every reception. Due to this, the target SIR control unit decreases the target SIR by a preset second decrease amount for every reception.

Next, after the NG determination result of the CRC occurs, the determination result of the CRC becomes OK for every reception. Due to this, the target SIR control unit decreases the target SIR corresponding to the reception by the preset first decrease amount. As a result, if the decrease amount of the target SIR is equal to a preset normal communication criterion after the increase in the target SIR stops, the target SIR control unit determines that the state of the communication environment is the normal communication state.

The target SIR control unit decreases the target SIR by the preset second decrease amount, and determines that the state of the communication environment is the normal communication state even if the target SIR is lower than a preset normal communication state threshold.

In each of the detected states, the target SIR control unit controls the target SIR to be decreased to correspond to the state whichever state is detected unless a new NG determination result of the BLER is obtained.

The decrease amount of the target SIR for the burst error return state may be set larger than the decrease amounts of the target SIR for the burst error state and the normal communication state. In this case, the target SIR is decreased by a large degree in the burst error return state, thereby accelerating a speed of decreasing the target SIR.

As a result, if the communication environment between the base station and the mobile terminal is temporarily deteriorated for some reason, the BLER is determined as NG, and the communication environment is improved back to original immediately after the NG determination, then the decrease in the target SIR is accelerated according to the improvement in the communication quality, and the target SIR can be set to an appropriate target SIR.

If the burst error state is detected, the target SIR is decreased by the first decrease amount. Since a step of the decrease amount of the target SIR is small, it is possible to avoid a situation in which the target SIR is decreased to result in the NG determination of the BLER even if the burst error state continues. Therefore, the target SIR is controlled to be the appropriate target SIR.

Effects of the Invention

According to the present invention, a mobile terminal detecting an instantaneous deterioration or restoration of a communication environment and quickly converging an SIR into an appropriate target SIR, thereby preventing requesting an excessive transmission power from a base station is obtained.

Exemplary Embodiment

As already described, the target SIR control according to the WCDMA is conventionally performed based only on a determination of the BLER.

Due to this, to control the target SIR to be increased, the target SIR can be instantly increased corresponding to and according to a change in a communication environment. However, to control the target SIR to be decreased, the target SIR cannot be always instantly changed according to the change in the communication environment.

The inventor, therefore, proposes a control over a target SIR of a mobile terminal to appropriately decrease a target SIR to correspond to a minute detection of a change in a communication environment by using detection of a decrease in the target SIR and the conventional detection of a change in the communication environment based on the BLER, and by minutely detecting the communication environment.

An exemplary embodiment of the present invention will be described in detail with reference to the drawings.

FIG. 2 is a block diagram showing an example of a configuration of a mobile terminal according to an exemplary embodiment of the present invention.

Referring to FIG. 2, the mobile terminal according to the exemplary embodiment includes an aerial wire 109 for transmitting or receiving an electromagnetic wave to or from a base station (not shown), a radio unit 101 transmitting or receiving the electromagnetic wave to or from the aerial wire 109, a modulator-demodulator 102 demodulating a high frequency signal from the radio unit 101 or converting an encoded signal into a modulated signal, an encoder-decoder 103 generating an encoded signal to be transmitted or decoding an input demodulated signal and outputting a target BLER and a BLER indicating a result of a cyclic redundancy check (CRC), an SIR measuring unit 104 calculating an SIR from the demodulate signal input from the modulator-demodulator 102, a target SIR control unit 105 detecting a burst error state indicating a deterioration in a communication environment, a burst error return state indicating a return of the communication environment, and a normal communication state indicating a favorable state of the communication environment, respectively, based on the result of the CRC input from the encoder-decoder 103 and a change amount of the target SIR, and controlling an increase or a decrease in the target SIR according to the detected states, and a TPC (Transmission Power Control) unit 106 deciding an uplink TPC bit based on the SIR output from the SIR measuring unit 104 and the target SIR decided by the target SIR control unit 105.

The target SIR control unit 105 includes a conventional function of increasing the target SIR by a preset increase amount based on the target BLER input from the encoder-decoder 103 and the BLER indicating the determination result of the CRC and also a function of detecting the above-described states of the communication environment.

The detection of the three states of the communication environment that is the function of the target SIR control unit 105 will be described in detail as follows.

The mobile terminal receives a transmission signal from the base station. The target SIR is increased if the BLER that is the result of the CRC at the time of reception of the signal indicates NG. Thereafter, if the BLER that is the result of the CRC at the time of reception of the signal again repeatedly indicates NG, then the target SIR is increased by a preset increase amount for every NG determination. The target SIR control unit 105 detects this state and determines that the state of the communication environment is the burst error state.

Further, the mobile terminal receives a transmission signal transmitted from the base station. The target SIR is increased by the preset increase amount if the BLER that is the determination result of the CRC at the time of previous reception of the signal indicates NG. Thereafter, if the CRC temporarily indicates OK, the target SIR is decreased by a preset first decrease amount. However, before the target SIR decreases down to a preset burst error criterion, the determination result of the CRC indicates NG again then the target SIR is increased by a preset increase amount. Therefore, the target SIR control unit 105 detects this state and determines that the state of the communication environment is also the burst error state.

After determining that the state of the communication environment is the burst error state at the time of previous reception of the signal, the target SIR control unit 105 obtains the OK determination result of the CRC for every reception. The target SIR control unit 105 decreases the target SIR by the preset first decrease amount for every reception. As a result, if a decrease amount of the target SIR is equal to a preset burst error return criterion after the increase in the target SIR stops, the target SIR control unit 105 determines that the state of the communication environment is the burst error return state.

The target SIR control unit 105 obtains the OK determination result of the CRC for every reception after determining that the state of the communication environment is the burst error return state. Accordingly, the target SIR control unit 105 decreases the target SIR by a preset second decrease amount for every reception.

The target SIR control unit 105 obtains the NG determination indicated by the BLER that is the determination result of the CRC, and increases the target SIR by a preset increase amount. Thereafter, whenever the BLER that is the result of the CRC indicates OK, the target SIR control unit 105 decreases the target SIR by the preset first decrease amount. As a result, if the decrease amount of the target SIR is equal to a preset normal communication state criterion after the increase in the target SIR stops, the target SIR control unit 105 detects this state and determines that the state of the communication environment is the normal communication state.

Moreover, after determining that the state of the communication environment is the burst error return state, the target SIR control unit 105 decreases the target SIR by a preset second decrease amount whenever the BLER that is the result of the CRC indicates OK. Even if the target SIR is lower than a preset normal communication state threshold, the target SIR control unit 105 determines that the state of the communication environment is the normal communication state.

The radio unit 101 is a high frequency signal processing circuit that transmits or receives a radio frequency signal. The radio unit 101 has a function of outputting to the aerial wire 109 a high frequency signal modulated by a baseband modulation signal input from the modulator-demodulator 102 and subjected to a frequency conversion. Further, the radio unit 101 has a function of receiving a high frequency signal received by the aerial wire 109 transmitted from the base station and subjecting the high frequency signal to a frequency conversion, and outputting the frequency-converted signal to the modulator-demodulator 102.

The modulator-demodulator 102 has a demodulation function of demodulating the radio frequency signal subjected to the frequency conversion by the radio unit 101 and outputting a baseband demodulation signal. The modulator-demodulator 102 also has a modulation function of generating a baseband modulation signal based on an encoded signal input from the encoder-decoder 103 and outputting the baseband modulation signal.

The encoder-decoder 103 has an encoding function of generating an encoded signal to be transmitted and outputting the encoded signal to the modulator-demodulator 102. The encoder-decoder 103 also has a function of decoding the baseband demodulation signal input from the modulator-demodulator 102, making a CRC determination or the like that is one of data error detection methods, extracting the target BLER transmitted from the base station, and outputting these to the target SIR control unit 105.

This target BLER is a parameter designated by a network and included in information received by the mobile terminal according to the exemplary embodiment and decoded by the encoder-decoder 103.

The SIR measuring unit 104 has a function of calculating an SIR from the baseband demodulation signal output from the modulator-demodulator 102 and outputting the SIR.

The TPC unit 106 has a function of deciding a TPC bit on an uplink from the mobile terminal to the base station based on the SIR calculated by the SIR measuring unit 104 and the target SIR decided by the target SIR control unit 105.

The aerial wire 109 is connected to one end of the radio unit 101, the other end of the radio unit 101 is connected to one end of the modulator-demodulator 102, the other end of the modulator-demodulator 102 is connected to one end of the SIR measuring unit 104, and the other end of the SIR measuring unit 104 is connected to one end of the TPC unit 106.

The modulator-demodulator is connected to one end of the encoder-decoder 103, the other end of the encoder-decoder 103 is connected to one end of the target SIR control unit 105, the other end of the target SIR control unit 105 is connected to the other end of the TPC unit 106, and an output end of the TPC unit 106 is connected to the encoder-decoder 103.

Operation performed by a mobile terminal device according to the exemplary embodiment of the present invention will next be described with reference to FIGS. 1 to 4 in detail.

A transmission signal transmitted from the base station (not shown) is received by the aerial wire 109 of the mobile terminal. The transmission signal transmitted from the base station and received by the aerial wire 109 is input to the radio unit 101, and subjected to a frequency conversion, and converted into a radio frequency signal in a frequency band in which a baseband processing can be performed on the signal. The radio frequency signal is input to the modulator-demodulator 102. The radio frequency signal input to the modulator-demodulator 102 is demodulated into a baseband demodulation signal, and the baseband demodulation signal is input to the encoder-decoder 103 and the SIR measuring unit 104.

The SIR measuring unit 104 calculates a signal to interference ratio (SIR) based on the input baseband demodulation signal input to the SIR measuring unit 104. The calculated SIR is input to the TPC unit 106.

The encoder-decoder 103 makes a cyclic redundancy check (CRC) based on the input baseband demodulation signal input to the encoder-decoder 103 to calculate a BLER, and calculates a target BLER. The CRC determination result and the calculated target BLER are input to the target SIR control unit 105.

The target SIR control unit 105 performs the processing to be described below based on the input CRC determination result BLER and the target BLER input to the target SIR control unit 105.

FIG. 3 is a flowchart showing operation performed by the target SIR control unit 105 of the mobile terminal according to the exemplary embodiment.

As shown therein, when the mobile terminal starts a communication with the base station using an individual channel, the target SIR control unit 105 sets an initial value of the target SIR at the start and starts a target SIR control (step 201).

Specifically, in the target SIR control, the target SIR control unit 105 decides the target SIR so that the communication quality converges into the target BLER output from the encoder-decoder 103.

To control the target SIR to be increased or decreased for deciding this target SIR, the target SIR may be controlled to be increased or decreased at the beginning of reception similarly to the conventional technique. Alternatively, the target SIR may be decreased by the preset first decrease amount for the instance of detecting the normal communication state (step 202).

Similarly to the conventional mobile terminal, in this target SIR control, the BLER is detected for every reception. If the BLER indicates NG determination, the target SIR is increased by a certain amount of the preset increase amount of the target SIR. If the BLER indicates OK determination, the target SIR is decreased by a certain amount of step of the decrease amount.

During the target SIR control, the target SIR control unit 105 detects a burst error state, i.e., determines whether the communication state is the burst error state indicating the deterioration in the communication environment (step 204).

An example of this burst error state determination will next be described.

To detect whether the communication state is the burst error state, the following Expression (1) is used. If the Expression is satisfied, it is determined that the state of a communication line is the burst error state.

$$T\_SIR(T-1) > T\_SIR\_tbng + Sinc * T\_burstin \qquad (1)$$

Variables used in the Expression (1) correspond as follows.

T_SIR(T−1): previous target SIR (target SIR immediately after increase).

T_SIR_tbng: target SIR when CRC at the time of previous reception is NG, i.e., target SIR immediately before SIR increase.

Sinc: preset increase amount of target SIR.

T_burstin: burst error determination coefficient

The Expression (1) shows an instance in which CRC-NG indicating the NG determination result of the CRC (i.e., BLER indicates a NG determination result) continuously occurs by the time of previous reception, and in which CRC-NG occurs again before the target SIR is increased by the preset increase amount and then the target SIR is decreased down to the burst error criterion that is a certain ratio (indicated by Sinc*T_burstin in the Expression (1)). This state is referred to as "burst error state", and the SIR control unit 105 determines that the communication state is the burst error state when detecting this state.

Alternatively, the determination condition shown in the Expression (1) may be replaced by detection by the mobile terminal according to the exemplary embodiment of CRC-NG by a predetermined number of times or more as the condition (i.e., criterion) for determining the burst error state. In another alternative, continuous detection by the mobile terminal according to the exemplary embodiment of CRC-NG by a predetermined number of times or more may be set as the condition for determining the burst error state.

If the target SIR control unit 105 determines that the communication state is the burst error state and the mobile terminal according to the exemplary embodiment detects the OK determination result of the CRC next, the target SIR control unit 105 decreases the target SIR by the preset first decrease amount.

If the burst error state condition is not satisfied in the burst error state determination, then it is determined that the state of the communication with the base station is the normal communication state, the processing follows a left flow of No at the step 204, and the conventional target SIR control is continued at the step 202.

If the burst error determination condition is satisfied in the burst error detection at the step 204, then the processing follows a flow of Yes below the step 204, and the target SIR control unit 105 performs the target SIR control similarly to the conventional technique in this burst error state (step 205).

This target SIR control may be similar to that described in relation to the step 202. More specifically, if the target SIR control unit 105 determines that the communication state is the burst error state and the mobile terminal according to the exemplary embodiment detects the OK determination result of the CRC next, the target SIR control unit 105 may decrease the target SIR by the preset first decrease amount.

If the NG determination indicated by the BLER is obtained, the target SIR control unit 105 may increase the target SIR by the preset increase amount.

While the burst error is detected and the conventional target SIR is performed as stated above, the target SIR control unit 105 detects the normal communication state next, i.e., determines whether the communication state is the normal communication state (step 207).

An example of this normal communication state determination will next be described.

To detect whether the communication state is the normal communication state, the following Expression (2) is used. If the Expression is satisfied, the target SIR control unit 105 determines that the communication state is the normal communication state.

$$T\_SIR(T-1) < T\_SIR\_tbng + Sinc * T\_burstout \qquad (2)$$

A variable used in the Expression (2) corresponds as follows.

T_burstout: normal communication determination coefficient.

The Expression (2) shows an instance in which the target SIR is increased after occurrence of CRC-NG, then CRC-OK occurs, and the target SIR is decreased by a normal communication criterion that is a preset decrease amount (indicated by Sinc*T_burstout in the Expression (2)). This state is referred to as "normal communication state" indicating that the state of the communication environment is good, and the SIR control unit 105 determines that the communication state is the normal communication state when detecting this state.

It is assumed that a transport block of CRC-NG is received at the time of previous reception to satisfy the Expression (2).

In this manner, the decrease amount of the target SIR can be controlled according to the determination result of the CRC at the previous reception. Due to this, it is possible to appropriately control the target SIR to correspond to he determination result of the CRC.

Moreover, the target SIR control unit 105 may determine whether the communication state is the normal communication state not only using the Expression (2) but also by detecting that the target SIR is lower than the preset normal communication state threshold after determination of the burst error return state.

If the normal communication state condition is satisfied in this normal communication state determination, it is determined that the communication state is the normal communication state. Accordingly, the processing follows a flow of Yes on the left of the step 207, and the conventional target SIR control is continued at the step 202.

If it is determined that the communication state is not the normal communication state as a result of the normal communication state determination at the step 207, then the processing follows a flow of No below the step 207, and the SIR control unit 105 detects the burst error return state, i.e., determines whether the communication state is the burst error return state (step 209).

An example of the burst error return state determination will next be described.

To make this burst error return state determination, the following Expression (3) is used. If the Expression (3) is satisfied, it is determined that the communication state is turned into the burst error return state.

$$T\_SIR(T-1) < T\_SIR\_tbng + Sinc * T\_burstok \qquad (3)$$

A variable used in the Expression (3) corresponds as follows.

T_burstok: burst error return determination coefficient.

The Expression (3) shows an instance in which after CRC-NG indicating the NG determination of the previous CRC occurs and the target SIR is increased in a burst error state, CRC-OK indicating the OK determination of the CRC (i.e., the BLER indicates OK determination result) continues, and in which the target SIR can be decreased by a first decrease amount for every OK determination of the CRC and the target SIR can be decreased down to a burst error return criterion that is a preset decrease amount (indicated by Sinc*T_burstok in the Expression (3)).

It is assumed that the burst error state is detected to satisfy the Expression (3).

The state of satisfying the Expression (2) is referred to as "burst error return state" indicating return of the communication environment. The target SIR control unit 105 determines that the communication state is the burst error return state when detecting this state.

Furthermore, if the target SIR control unit 105 determines that the communication state is the burst error return state at the time of previous reception and the target SIR is decreased by the preset second decrease amount after CRC-OK indicating the OK determination result of the CRC at the time of next reception occurs, the target SIR control unit 105 may determine that the communication state is the burst error return state.

Alternatively, the determination condition shown in the Expression (3) may be replaced by reception by the mobile terminal according to the exemplary embodiment of CRC-OK indicating the OK determination result of the CRC by a predetermined number of times as the condition (i.e., criterion) for determining the burst error return state.

If the burst error return criterion is not satisfied as a result of the burst error return state determination at the step 209, that is, it is determined that the communication state is not the burst error return state, then the processing follows a flow of burst error return state "NO" on the right of the step 209, and the conventional target SIR control is continued at the step 205 (step 202).

At this time, the communication state is not turned into the burst error return state but the burst error state continues. The SIR control for decreasing the target SIR by the first decrease amount is performed for every NG determination result indicated by the BLER.

If the condition for the burst error return state determination is satisfied at the step 209, then the processing follows a flow of Yes below the step 209, and the target SIR control unit 105 performs the target SIR control (return) corresponding to the burst error return state (step 210).

If the target SIR control unit 105 performs the target SIR control (return) corresponding to the burst error return state, the target SIR control unit 105 decreases the target SIR by the second decrease amount larger than the first decrease amount that is a conventional decrease width of the target SIR, thereby decreasing the target SIR at a faster speed than that in the burst error state. Due to this, when the target SIR control unit 105 detects the burst error return state, it is possible to converge the target SIR into an appropriate value and to quickly change the control to the normal communication state control.

After decreasing the target SIR by the second decrease amount, the target SIR control unit 105 detects whether the communication state is the normal communication state, i.e., determine whether the communication state is the normal communication state (step 212).

If the determination condition for the normal communication state is not satisfied in the determination at the step 212, then the processing follows a flow of No on the right of the step 212, and the target SIR control unit 105 continues the target SIR control (return) corresponding to the burst error return state at the step 210 (step 210).

If the determination condition for the normal communication state shown in the Expression (2) is satisfied and the communication state is determined as the normal communication state in the determination at the step 212, then the processing follows a flow of Yes below the step 212, and the target SIR control unit 105 performs the target SIR control similarly to the conventional technique (step 202).

The target SIR control unit 105 performs the target SIR control through the above-stated procedures, and the target SIR decided as a result is input to the TPC unit 106.

The TPC unit 106 decides a TPC bit on an uplink based on the SIR output from the SIR measuring unit 104 and the target SIR decided by the target SIR control unit 105.

FIG. 4 shows an example of the state of the target SIR controlled by the target SIR control unit 105 in an environment in which such a sudden deterioration in the BLER instantaneously occurs.

In FIG. 4, vertical axes indicate the value of the target SIR, the value of the BLER, the burst error state, the burst error return state, and the normal state from above, sequentially. Each of horizontal axes is a time axis.

A polygonal curve 701 shown in FIG. 4 indicates a change in the target SIR decided by the target SIR control unit 105. A polygonal curve 702 indicates a change in the OK determination indicated by the BLER output from the encoder-decoder 103. A polygonal curve 703 indicates transition of the normal communication state BN, the burst error state BE, and the burst error return state BR of the received signal.

As for the polygonal curve 702, the state in which no pulse is present to coincide with the time axis shows the OK determination result indicated by the BLER (that is, the determination result of the CRC is CRC-OK) and shows that the communication environment is good. A state in which a pulse rise from the time axis shows the NG determination result indicated by the BLER (that is, the determination result of the CRC is CRC-NG). Further, if this pulse is higher upward, it is indicated that the block error rate is lower and that the communication environment is more deteriorated.

As shown therein, first in a state corresponding to a period Ta, the normal communication state BN is detected, the target SIR control unit 105 performs the target SIR control at the steps 201 and 202 shown in FIG. 3, and the target SIR control unit 105 then determines whether the communication state is the burst error state (step 204).

At this time, the determination condition for the burst error state (the Expression (1)) is not satisfied in the detection and determination of the step 204. Due to this, the target SIR control unit 105 continues the target SIR control at the step 202.

Next, the increased target SIR temporarily decreases before a period RP. However, before the target SIR is decreased by the burst error criterion (indicated by P1 in FIG. 4), the communication environment is deteriorated again and the BLER is suddenly deteriorated. This sudden deterioration is observed during the time RP in the polygonal curve 702. In a state corresponding to the period Tc starting at time t2, the determination condition for the burst error state shown in the Expression (1) is satisfied at the step 204.

Since the state coincides with the condition shown in the Expression (1), when the target SIR control unit 105 detects the burst error state BE and determines that the communication state is the burst error state BE, the target SIR control unit 105 performs the target SIR control similarly to the conventional technique as shown in the step 205.

By this control of the target SIR, if CRC-OK indicating the OK determination result of the CRC at the time of the next reception, the target SIR is decreased by the preset first decrease amount for every reception. In the state in which the CRC-OK indicating the OK determination continues, the target SIR is decreased by the burst error return criterion.

After the conventional target SIR control is performed at the step 205, in a state corresponding to the period Tc, the target SIR control unit 105 determines whether the communication state is the normal communication state shown in the Expression (2) at the step 207. Since the determination result does not indicate the normal communication state (which corresponds to the burst error state BE), the processing follows a flow of No below the step 207 and proceeds up to a step 209.

Next, at time t4 in a state of good BLER, the target SIR is decreased by the preset decrease amount. During a period Te starting at the time t4, the communication state is the burst error return state BR.

The target SIR control unit 105 detects and determines whether the communication state is the burst error return state using the Expression (3) at the step 209. Since the state in the period Te is the burst error return state BR, the determination condition for the burst error return state is satisfied.

Namely, by decreasing the target SIR by the preset first decrease amount for every reception in the target SIR control, the target SIR is decreased by the burst error criterion as indicated by P2 in FIG. 4. As a result, the target SIR control unit 105 determines that this state is the burst error return state BE.

While the communication state is the burst error return state, the target SIR control unit 105 performs the target SIR control (return) corresponding to the burst error return state at a step 210, and makes a normal communication state determination at a step 212.

During a period Tg starting at time t6, the target SIR control unit 105 determines whether the communication state is the normal communication state using the Expression (2). Since the determination result indicates the normal communication state, the processing follows a flow of Yes below the step 212 and proceeds up to the step 202.

In this target SIR control, the second decrease amount by which the target SIR is decreased in the burst error return state is larger than the first decrease amount during the conventional target SIR control as stated above. Therefore, it is possible to decrease the target SIR to an appropriate value according to the detected burst error return state.

As can be seen, in the mobile terminal according to the present invention, since the normal communication state in which the BLER indicates NG appears several time in an environment where a sudden deterioration of BLER instantaneously occurs as shown in FIG. 4, the communication state is turned into the burst error state and the burst error state is detected. Since the OK determination indicated by the BLER continues in this detected burst error state, the burst error return state is detected according to the situation of the decrease in the target SIR. Since the BLER is satisfactory even in this burst error return state, the target SIR is further decreased and the normal communication state is detected.

In this manner, while it takes the period Tm for the conventional mobile terminal to decrease the target SIR as shown in FIG. 1, the mobile terminal according to the exemplary embodiment can decrease the target SIR within shorter period (Tc+Te) and can converge the target SIR into an appropriate range, i.e., a range from S1 to S2 shown in FIG. 4 when the communication environment is returned into a good state.

As stated so far, the mobile terminal according to the exemplary embodiment of the present invention can exhibit the following excellent advantages.

(1) The mobile terminal has the function of detecting not only the burst error state and the normal state but also the burst error return state and, therefore, can decide the target SIR corresponding to one of these states. Therefore, as compared with the control over the target SIR using only the target BLER, it is possible to more promptly change the transmission power from the base station.

(2) In the mobile terminal according to the exemplary embodiment, if the communication environment is changed from the good communication environment in which the target BLER is satisfied with a low SIR to the bad communication environment in which the target BLER cannot be satisfied without a higher SIR, it is necessary to continuously increase the target SIR to satisfy the target BLER. The mobile terminal has the function to meet this demand, detects the instantaneous deterioration in the BLER, and promptly converge the target SIR into the appropriate target SIR, thereby making it possible to prevent requesting a excessive transmission power from the base station.

(3) Even in the communication environment in which the BLER is deteriorated instantaneously and rapidly by shadowing or the like, the mobile terminal according to the exemplary embodiment detects whether the communication state is the burst error state, the normal state or the burst error return state and controls the target SIR. Due to this, it is possible to demand to reduce the transmission power from the base station immediately after the return of the communication environment, and it is possible to prevent the base station from transmitting signals with excessive power.

(4) Even if the communication state is continuously bad or the communication state is recovered only gradually, the mobile terminal according to the exemplary embodiment maintains the state in which the decrease amount of the target SIR is small while increasing the target SIR according to this communication environment, thereby making it possible to appropriately control the target SIR in the bad communication state.

Figure 1:
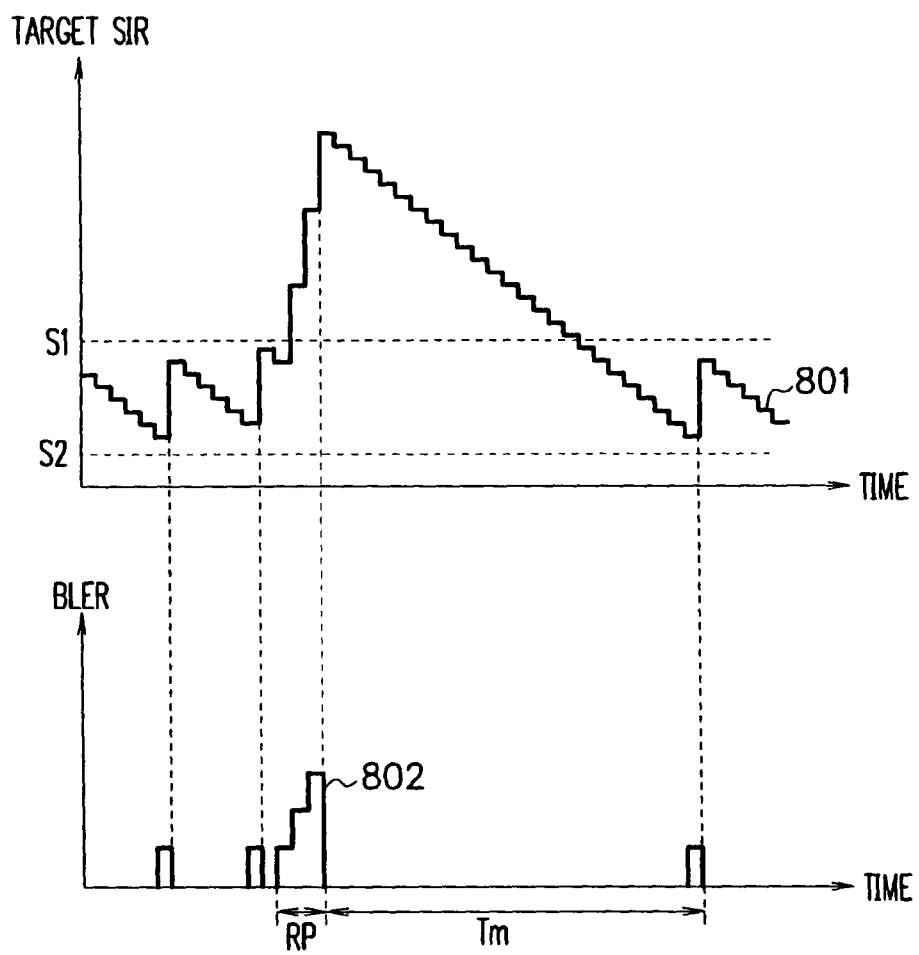
FIG. 1 is a target SIR control chart showing an example of a control by a conventional mobile terminal.
Figure 2:
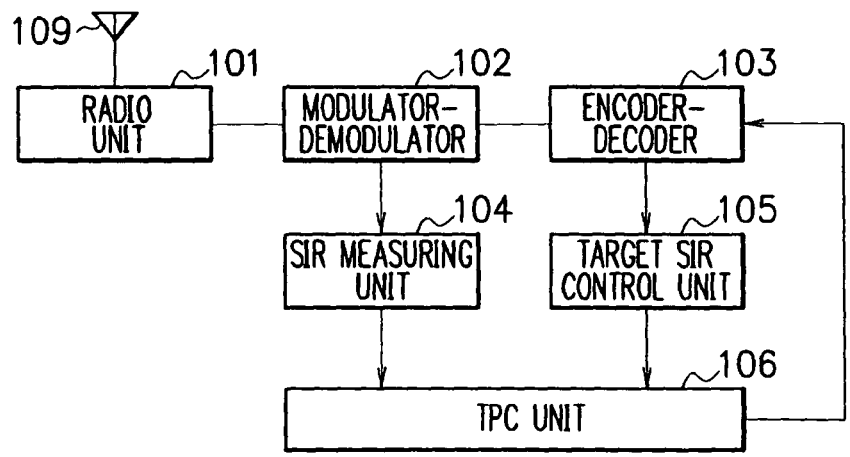
FIG. 2 is a block diagram showing an example of a configuration of a mobile terminal according to an exemplary embodiment of the present invention.
Figure 3:
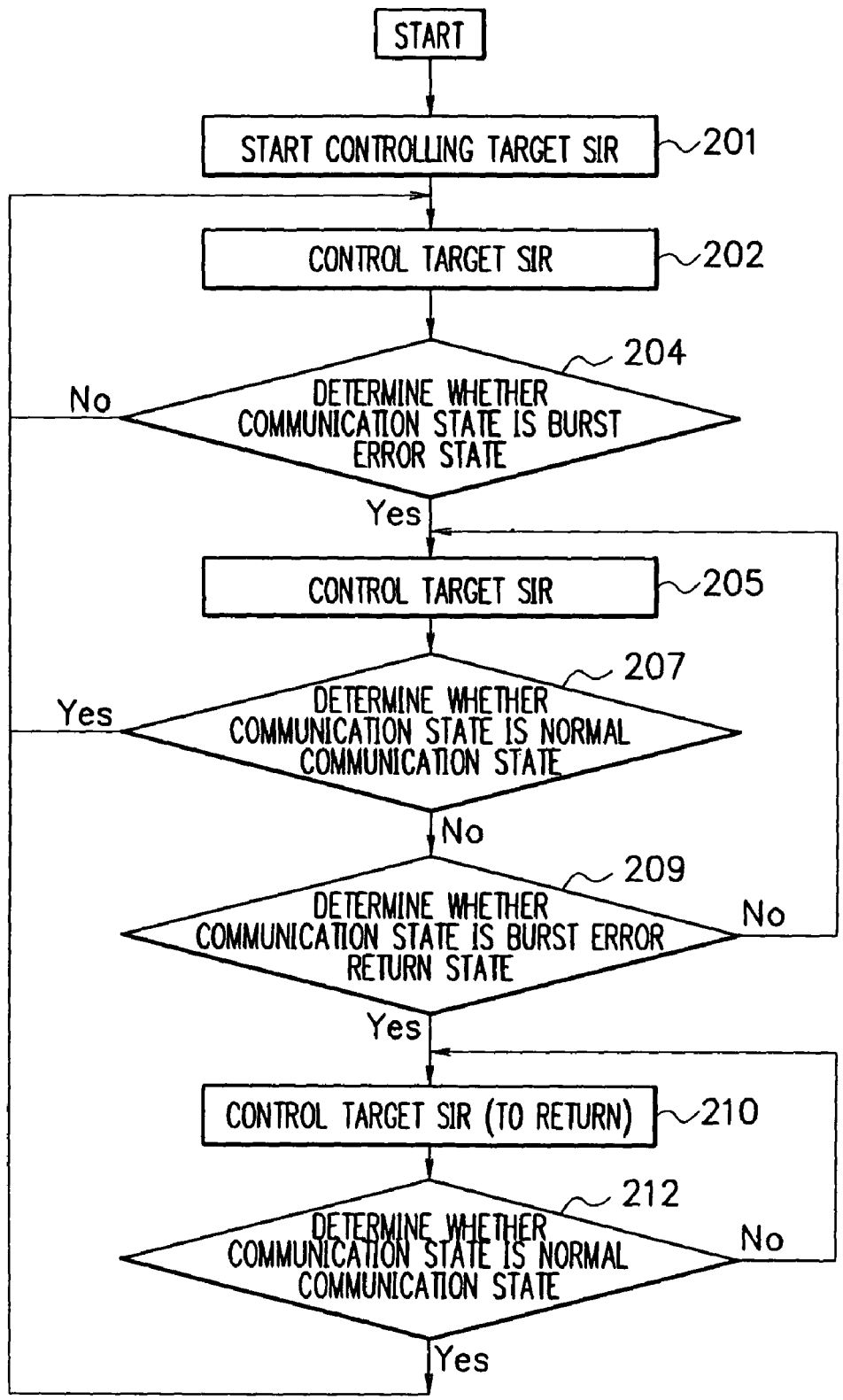
FIG. 3 is a flowchart showing operation performed by a target SIR control unit of the mobile terminal according to the exemplary embodiment.
Figure 4:
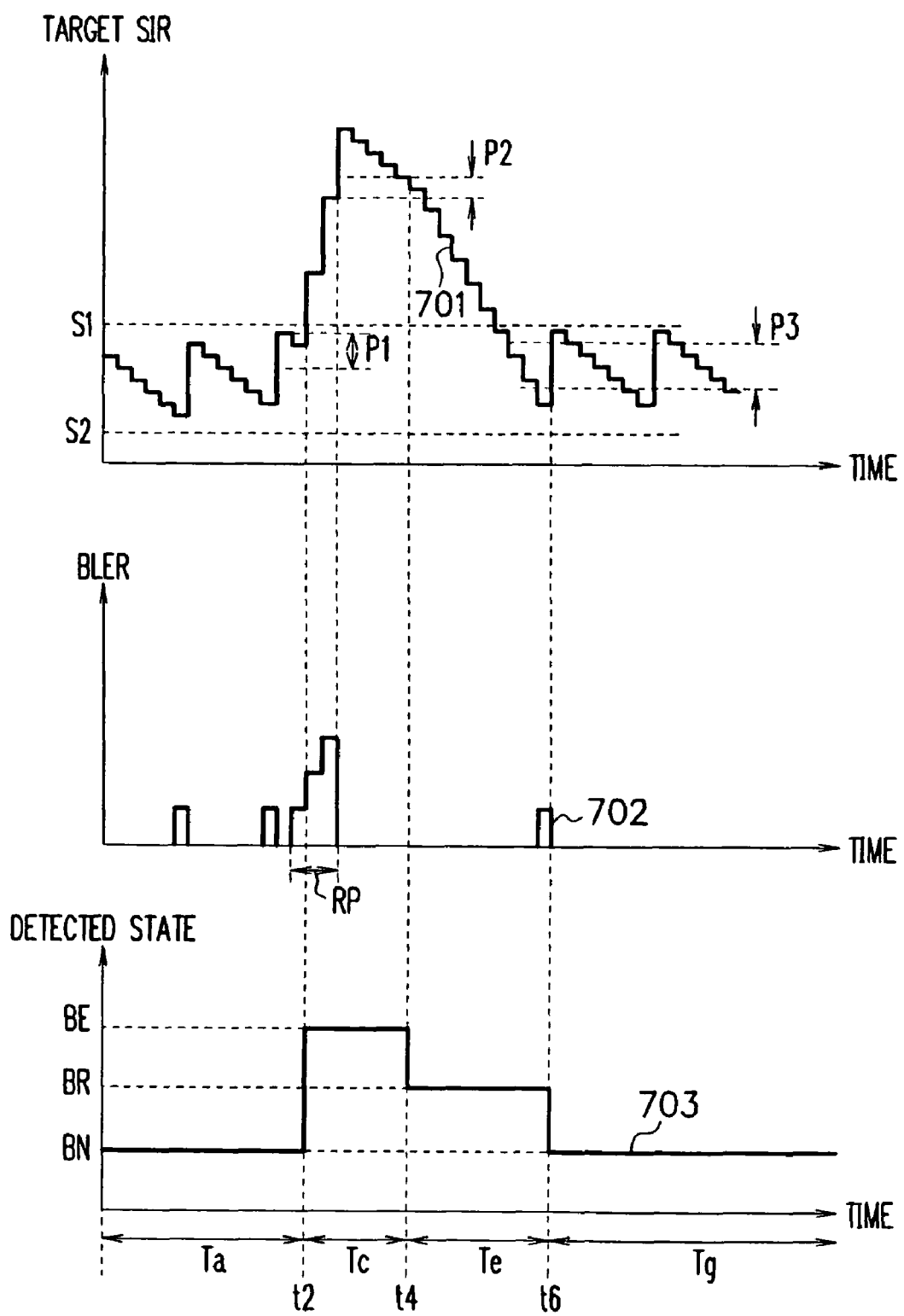
FIG. 4 is a target SIR control chart showing an example of a control by the mobile terminal according to the exemplary embodiment.

DESCRIPTION OF REFERENCE SYMBOLS 101 radio unit
102 modulator-demodulator
103 decoder
104 SIR measuring unit
105 target SIR control unit
106 TPC unit
109 aerial wire (antenna)
201, 202, 204, 205, 207, 209, 210, 212 step
701 polygonal curve indicating change in target SIR
702 polygonal curve indicating change in BLER
703 polygonal curve indicating change in detected state
801 polygonal curve indicating change in target SIR
802 polygonal curve indicating change in BLER
BE burst error state
BR burst error return state
BN normal communication state
P1 burst error criterion
P2 burst error return criterion
P3 normal communication criterion
RP period
t2, t4, t6 time
Ta period in normal communication state
Tc period in burst error state
Te period in burst error return state
Tg period in normal communication state

The invention claimed is:

1. A mobile terminal conducting a cyclic redundancy check on a transmitted signal from a base station to detect a communication environment of a communication with the base station, and increasing or decreasing a target SIR for deciding a transmission power from the base station, comprising
a target Signal-to-Interference-Ratio (SIR) control unit that: after increasing the target SIR by a preset increase amount according to a No Good determination result of the cyclic redundancy check and before decreasing the target SIR by a burst error criterion that is a preset decrease amount, detects that the No Good determination result of the cyclic redundancy check occurs again, determines that a detected state is a burst error state indicating a deterioration in the communication environment, and decreases the target SIR by a first decrease amount whenever an OK determination result of the cyclic redundancy check is obtained after determining the burst error state;
after detecting the burst error state, detects a state in which the target SIR is decreased by a burst error return criterion that is a preset decrease amount, determines that a detected state is a burst error return state indicating a return of the communication environment, and decreases the target SIR by a preset second decrease amount whenever the OK determination result of the cyclic redundancy check is obtained; and
detects a state in which the target SIR is decreased by a normal communication criterion that is a preset decrease amount after detecting that the No Good determination result of the cyclic redundancy check occurs, or detects that the target SIR is below a preset normal communication state threshold value after determining the burst error return state, then determines that the detected state is a normal communication state indicating a good state of the communication environment, and decreases the target SIR by the first decrease amount.

2. The mobile terminal according to claim 1,
wherein the target SIR control unit detects that a following expression (1) is satisfied when it is assumed that the target SIR immediately after an increase is T_SIR(T−1), the target SIR when the NG determination result of the cyclic redundancy check is detected and immediately before the increase is T_SIR_tbng, the increase amount of the target SIR is Sinc, and a burst error determination coefficient for determining the burst error state is T_burstin, and determines that the detected state is the burst error state:

$$T\_SIR(T-1) > T\_SIR\_tbng + Sinc * T\_burstin \quad (1).$$

3. The mobile terminal according to claim 1,
wherein the target SIR control unit detects that a following expression (2) is satisfied when it is assumed that the target SIR immediately after an increase is T_SIR(T−1), the target SIR when the NG determination result of the cyclic redundancy check is detected and immediately before the increase is T_SIR_tbng, the increase amount of the target SIR is Sinc, and a normal communication determination coefficient for determining the normal communication state is T_burstout, and determines that the detected state is the normal communication state:

$$T\_SIR(T-1) < T\_SIR\_tbng + Sinc * T\_burstout \quad (2).$$

4. The mobile terminal according to claim 1,
wherein the target SIR control unit detects that a following expression (3) is satisfied when it is assumed that the target SIR immediately after an increase is T_SIR(T−1), the target SIR when the NG determination result of the cyclic redundancy check is detected and immediately before the increase is T_SIR_tbng, the increase amount of the target SIR is Sinc, and a burst error return determination coefficient for determining the burst error return state is T_burstok, and determines that the detected state is the burst error return state:

$$T\_SIR(T-1) < T\_SIR\_tbng + Sinc * T\_burstok \quad (3).$$

5. The mobile terminal according to claim 2,
wherein the burst error criterion is indicated by the Sinc*T_burstin in the expression (1).

6. The mobile terminal according to claim 3,
wherein the normal communication criterion is indicated by the Sinc*T_burstout in the expression (2).

7. The mobile terminal according to claim 4,
wherein the burst error return criterion is indicated by the Sinc*T_burstok in the expression (3).

8. A method of controlling a mobile terminal conducting a cyclic redundancy check on a transmitted signal from a base station to detect a communication environment of a communication with the base station, and increasing or decreasing a target SIR for deciding a transmission power from the base station, and comprising steps of:
after increasing the target Signal-to-Interference-Ratio by a preset increase amount according to a No Good determination result of the cyclic redundancy check and before decreasing the target SIR by a burst error criterion that is a preset decrease amount, detecting that the No Good determination result of the cyclic redundancy check occurs again, determining that a detected state is a burst error state indicating a deterioration in the communication environment, and decreasing the target SIR by a first decrease amount whenever an OK determination result of the cyclic redundancy check is obtained after determining the burst error state;

after detecting the burst error state, detecting a state in which the target SIR is decreased by a burst error return criterion that is a preset decrease amount, determining that a detected state is a burst error return state indicating a return of the communication environment, and decreasing the target SIR by a preset second decrease amount whenever the OK determination result of the cyclic redundancy check is obtained; and detecting a state in which the target SIR is decreased by a normal communication criterion that is a preset decrease amount after detecting that the No Good determination result of the cyclic redundancy check occurs or detecting that the target SIR is below a preset normal communication state threshold value after determining the burst error return state, determining that the detected state is a normal communication state indicating a good state of the communication environment, and decreasing the target SIR by the first decrease amount.

* * * * *